United States Patent
Hsiao

[19]

[11] Patent Number: 6,155,285

[45] Date of Patent: Dec. 5, 2000

[54] GAS SAFETY VALVE

[76] Inventor: Chi-Chen Hsiao, 531, Pei-Shin Street, Chia Yi City, Taiwan

[21] Appl. No.: 09/385,440

[22] Filed: Aug. 30, 1999

[51] Int. Cl.[7] .................................................. F16K 17/40
[52] U.S. Cl. .......................... 137/75; 137/460; 137/519.5
[58] Field of Search .......................... 137/75, 517, 519.5, 137/460

[56] References Cited

U.S. PATENT DOCUMENTS

| | | | |
|---|---|---|---|
| 3,690,336 | 9/1972 | Drum | 137/75 |
| 4,745,940 | 5/1988 | Ely | 137/75 |
| 4,911,194 | 3/1990 | Lechner . | |
| 4,974,623 | 12/1990 | Sturgis | 137/75 |
| 5,472,008 | 12/1995 | Boarin | 137/75 |
| 5,553,638 | 9/1996 | Home . | |
| 5,983,928 | 11/1999 | Hsiao . | |

FOREIGN PATENT DOCUMENTS 239537  1/1995  Taiwan .

Primary Examiner—Gregory L. Huson
Assistant Examiner—Ramesh Krishnamurthy
Attorney, Agent, or Firm—Larson & Taylor, PLC

[57] ABSTRACT

A gas safety valve includes a main body having a longitudinal through hole that defines a gas passage. A ball is moved to a position blocking the gas passage when a sudden pressure drop occurs in the outlet end of the gas passage. A connector is mounted around a portion of the main body and includes an inner flange. An insert is mounted between the inner flange of the connector and an outer flange of the main body. The insert melts when it reaches a pre-determined temperature to shut off gas supply

5 Claims, 5 Drawing Sheets

6,155,285

GAS SAFETY VALVE

BACKGROUND OF THE INVENTION

1. Field of the Invention

The present invention relates to an improved gas safety valve that can be automatically shut off when ambient temperature is abnormally high.

2. Description of the Related Art

Taiwan Utility Model Publication No. 239537 issued on Jan. 3, 1995 and entitled "GAS OVERFLOW CONTROL VALVE" discloses a control valve having a plastic insert of low melting point mounted to a front end of a valve body for urging a valve stem in a valve seat to allow gas to pass through an aperture in the valve stem. When the ambient temperature rises, the plastic member melts. The valve stem is biased by a spring such that the aperture in the valve stem is hidden in the valve seat to stop output of gas.

U.S. Pat. No. 5,553,638 issued on Sep. 10, 1996 to Home discloses a cylinder valve insert that is mounted within the outlet of a cylinder valve of a cylinder to allow a fluid to pass through the valve when a male fitting is sufficiently engaged with the outlet, and to prevent such fluid flow when the male fitting is separated therefrom.

U.S. Pat. No. 4,911,194 issued on Mar. 27, 1990 to Lechner discloses a thermally-sensitive coupling device that has a weakened portion mounted to the sleeve member. The weakened portion melts when its temperature is greater than a pre-determined magnitude, such that the sleeve member is incapable of supporting the body. Thus, the valve is shut off to stop supply of gas.

U.S. Pat. No. 5,983,928 issued Nov. 16, 1999 discloses a gas safety valve that can be shut off when a pressure difference between two ends of the ball is relatively high.

The present invention is intended to provide an improved gas safety valve that can be automatically shut off by either an abnormal temperature rise or sudden pressure drop.

SUMMARY OF THE INVENTION

It is an object of the present invention to provide a gas safety valve that has a main body with a longitudinal through hole for defining a gas passage. When a sudden pressure drop occurs in the outlet end of the main body, the pressure difference between two sides of a ball in the gas passage is moved to a position blocking the gas passage, thereby stopping gas supply. A connector is mounted around a portion of the main body and includes an inner flange. An insert is mounted between the inner flange of the connector and an outer flange of the main body. The insert melts when it reaches a pre-determined temperature. A gas supply hole of a valve stem is moved under action of an elastic member to a position no longer communicates with the gas source to thereby stop gas supply.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
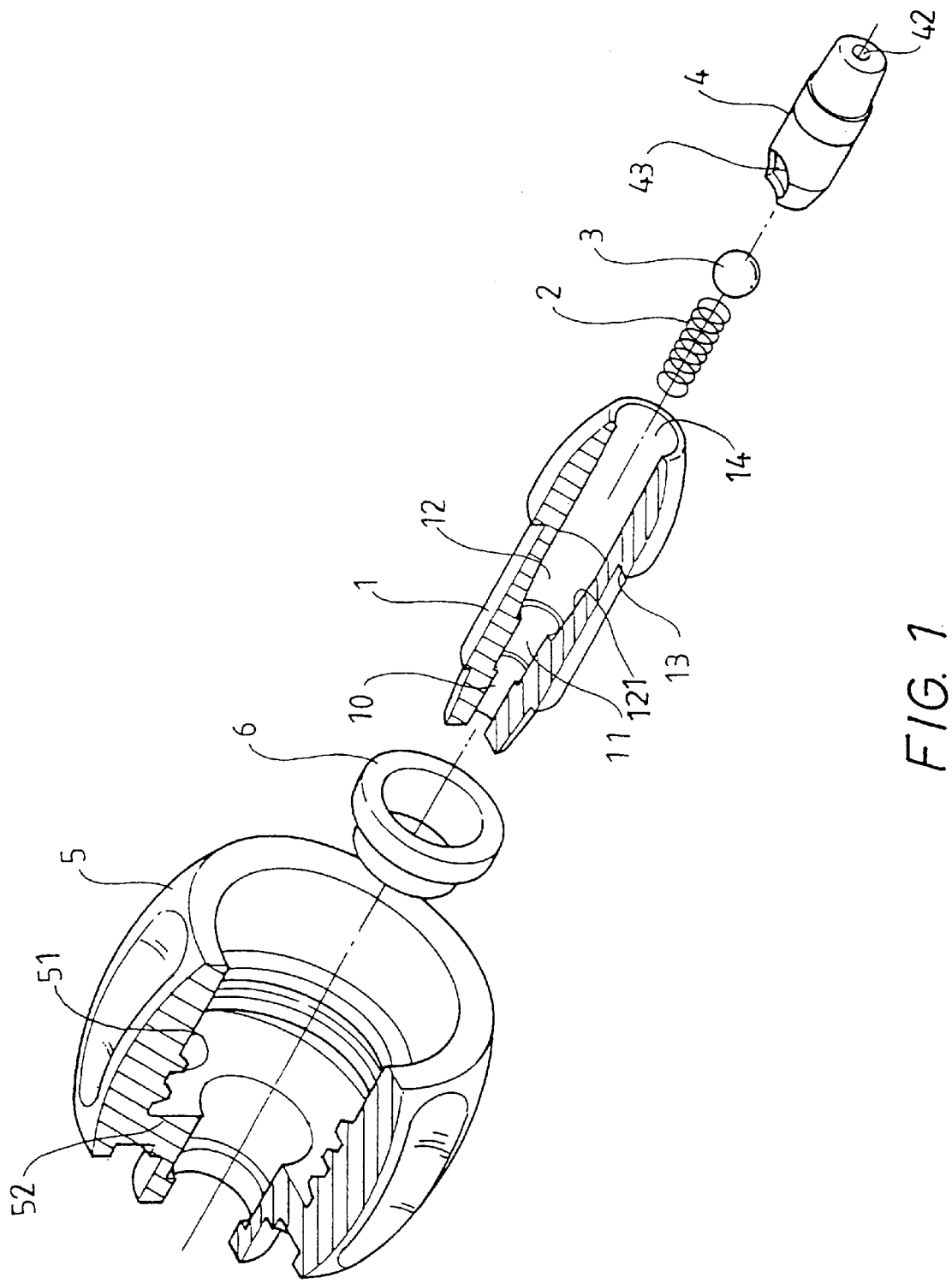
FIG. 1 is an exploded perspective view of a gas safety valve in accordance with the present invention.
Figure 2:
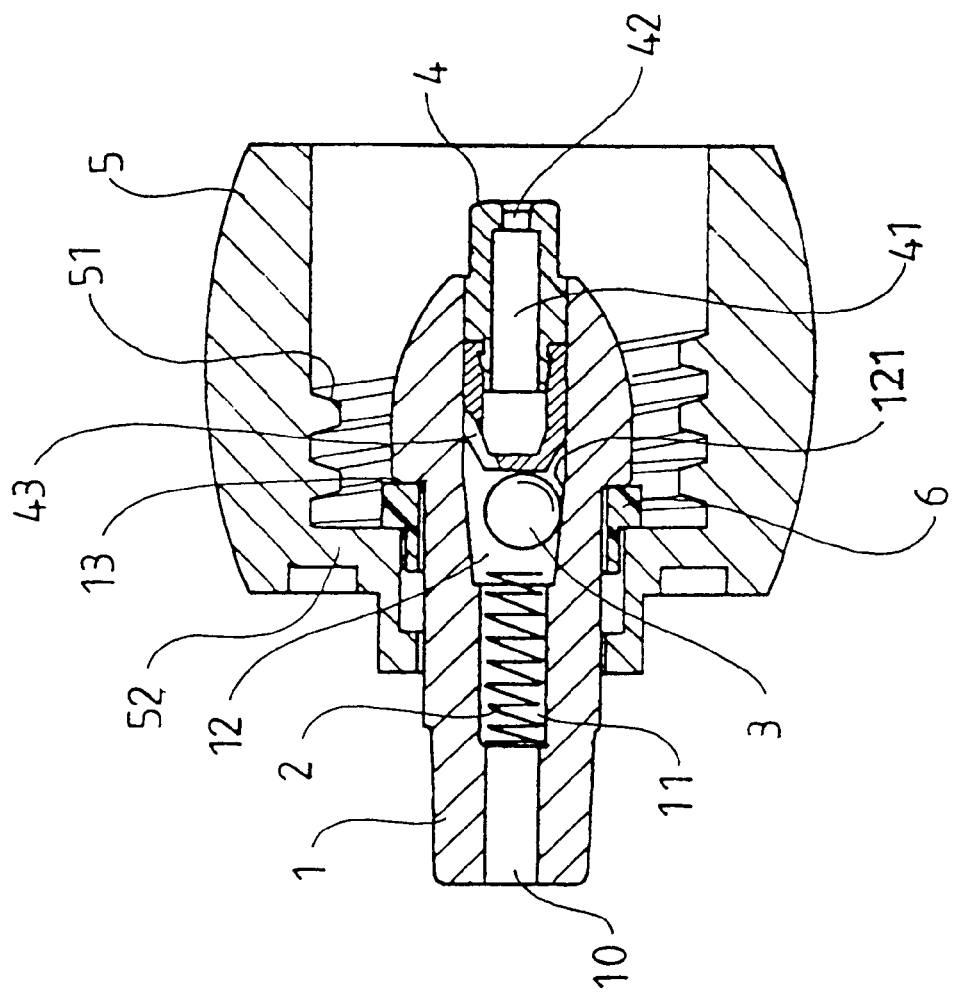
FIG. 2 is a longitudinal sectional view of the gas safety valve in accordance with the present invention.

Referring to FIGS. 1 and 2, a gas safety valve in accordance with the present invention generally includes a main body 1, a spring 2, a ball 3, a restraining member 4, a connector 5, and an insert 6. The main body 1 includes a longitudinal through hole having a stepped configuration. More specifically, the longitudinal through hole has an inlet end 14 for engaging with the restraining member 4, an outlet end 10, a first mediate section 11 adjacent to the outlet end 10 for receiving the spring 2, and a second mediate section 12 between the first mediate section 11 and the inlet end 14. The second mediate section 12 has a larger inner diameter than the first mediate section 11, which, in turn, has a larger inner diameter than the outlet end 10. The mediate section 12 may have a conic inner periphery 121. The main body 1 further includes an outer flange 13.

As shown in FIG. 2, the first mediate section 11 has a diameter greater than that of the outlet end 10 and includes a shoulder (not labeled) to which an end of the spring 2 is attached, The second mediate section 12 has a diameter greater than that of the first mediate section 12 such that the ball 3 (having a diameter greater than that of the inner diameter of the first mediate section 11) can be partially protruded into the first mediate section 11 to block a gas passage defined by the longitudinal through hole.

Figure 3:
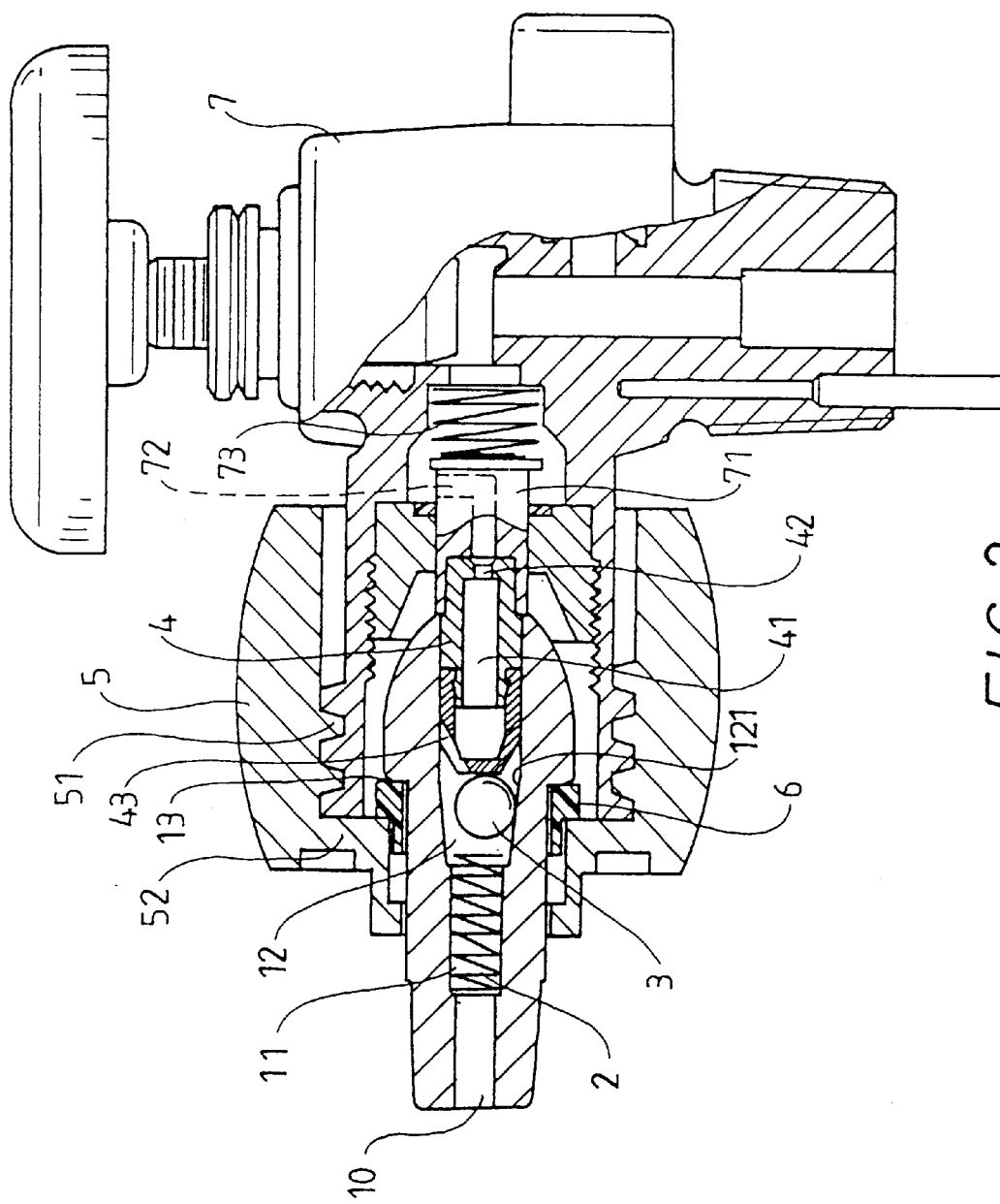
FIG. 3 is a partially sectioned view illustrating the gas safety valve mounted to a valve seat.

Referring to FIGS. 1 and 2, the restraining member 4 includes a gas passage 41 having an inlet 42 and an outlet 43 that does not face the ball 3, i.e., the ball 3 cannot block the outlet 43 of the restraining member 4. A connector 5 is mounted around a portion of the main body 1 for coupling with a valve seat 7 (FIG. 3). In this embodiment, the connector 5 includes an inner threading 51 for threadedly engaging with the valve seat 7. The connector 5 includes an inner flange 52 with a longitudinal bore (not labeled) through which the main body 1 extends. The insert 6 is mounted between the inner flange 52 of the connector 5 and the outer flange 13 of the main body 1, best shown in FIG. 2. The insert 6 is preferably made of plastic material (e.g., polyethylene) and has a low melting point of about 116–125° C. Before being molten, the insert 6 has certain rigidity and size so as to be mounted between the inner flange 52 of the connects 5 and the outer flange 13 of the main body 1.

Referring to FIG. 3, when coupled to the valve seat 7, the restraining member 4 engages with a valve stem 71 in the valve seat 7, wherein the inlet end 42 of the restraining member 4 communicates with a gas supply hole 72 in the valve stem 71 that is communicated with a gas source (not shown). The valve stem 71 is biased by an elastic member 73 to firmly bear against the restraining member 4. Thus, gas from the gas source is supplied via the gas supply hole 72, the gas passage 41, and the longitudinal passage of the main body 1.

Figure 4:
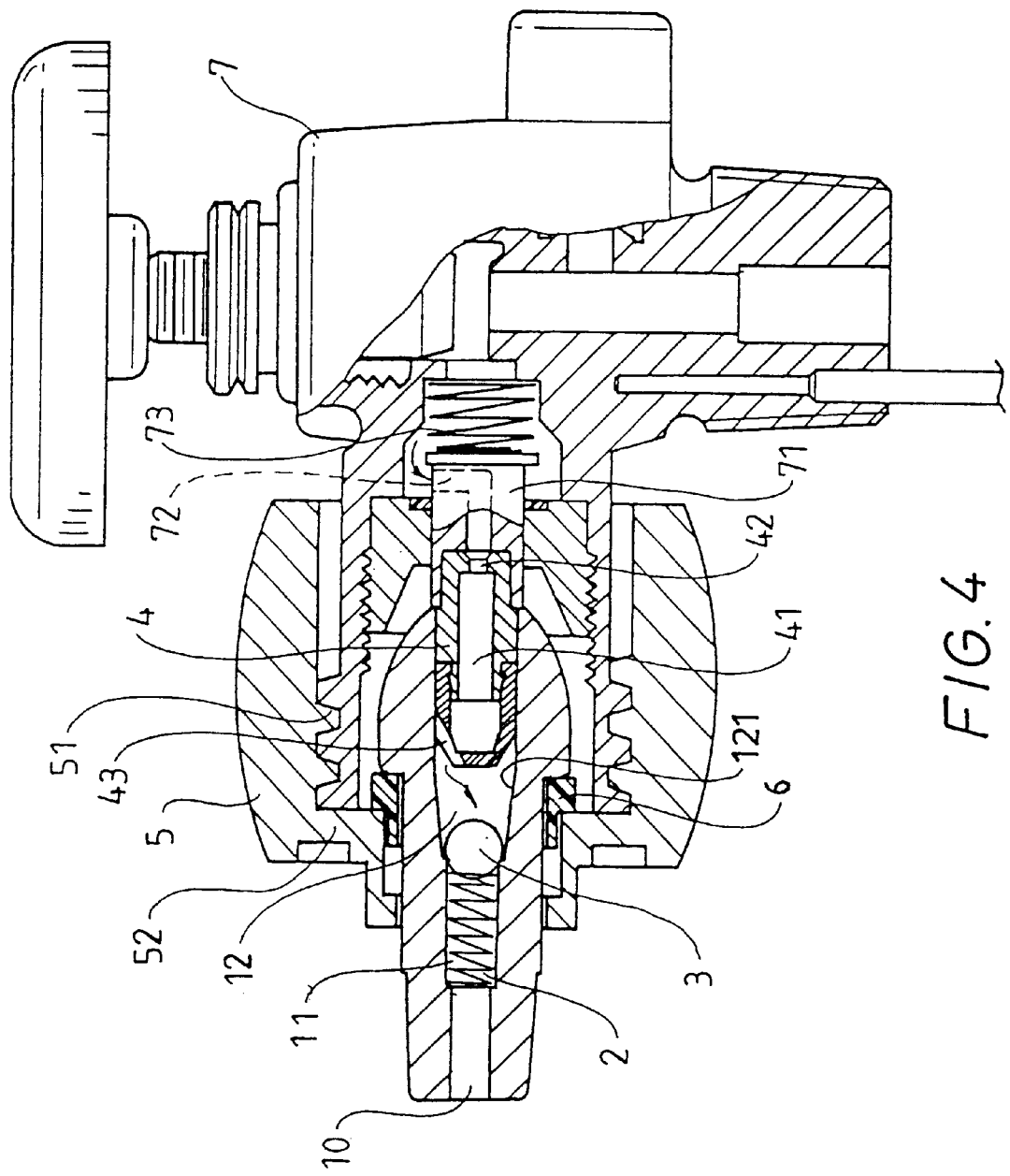
FIG. 4 is a view similar to FIG. 3, illustrating operation of the gas safety valve under sudden pressure drop.

In use, when no gas leakage occurs, a pressure difference between two sides of the ball 3 is relatively small, the ball 3 is biased by the spring 2 or due to configuration of the inner conic periphery 121 of the second mediate section 12 to a position not blocking the gas passage, as shown in FIG. 3. To the contrary, if gas leakage occurs, the pressure difference between the two sides of the ball 3 is relatively high (e.g., there is a sudden pressure drop in the out end of the main body 1) and thus forces the ball 3 to move toward the outlet end 10 of the main body 1, as shown in FIG. 4. As a result, the gas passage is blocked to stop supply of gas from the gas source. When the leakage problem is solved, the ball 3 is biased by the spring 2 or due to configuration of the inner conic periphery 121 of the second mediate section 12 to the position shown in FIG. 3 to allow passage of gas.

Figure 5:
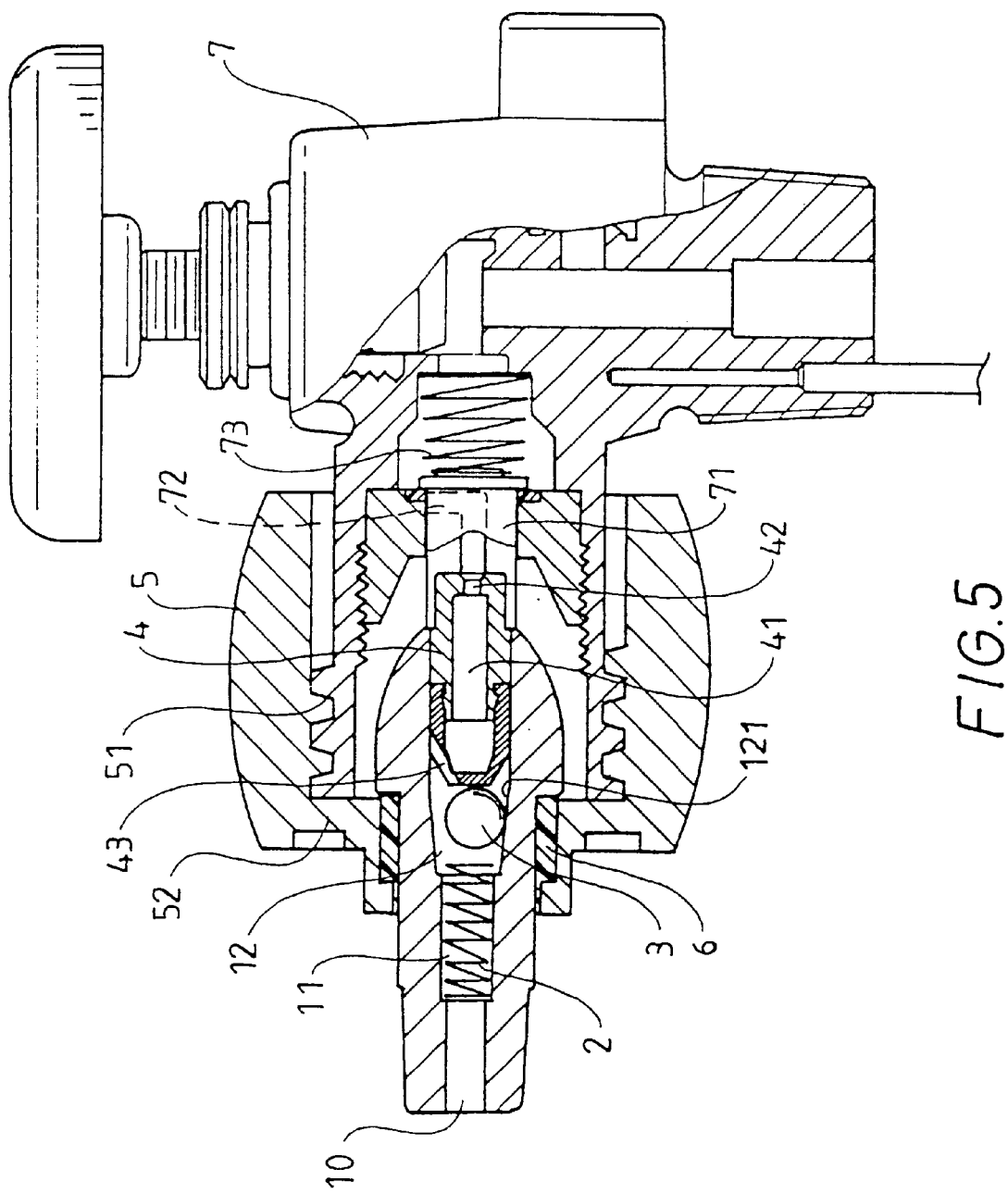
FIG. 5 is a view similar to FIG. 3, illustrating operation of the gas safety valve at high temperature.

Referring to FIG. 5, when ambient temperature rises to a predetermined magnitude, the insert 6 melts. The main body 1 is urged by the valve stem 71 under the action of the elastic member 73 toward the outlet end 10, thereby moving the gas supply hole 72 in the valve stem 71 to a position not communicated with the gas source. Thus, gas supply is stopped.

Although the invention has been explained in relation to its preferred embodiment, it is to be understood that many other possible modifications and variations can be made without departing from the spirit and scope of the invention as hereinafter claimed.

What is claimed is:

1. A gas safety valve comprising:

a main body including a longitudinal through hole that defines a gas passage of a stepped configuration, the longitudinal hole having an inlet end, an outlet end, a first mediate section adjacent to the outlet end, and a second mediate section between the first mediate section and the inlet end, the second mediate section having a diameter greater than that of the first mediate section, the main body further including an outer flange on an outer periphery thereof;

a spring mounted in the longitudinal through hole;

a ball movably mounted in the longitudinal through hole and capable of blocking the gas passage at an area that receives the spring;

a connector mounted around a portion of the main body and adapted to be connected to a valve seat having a valve stem with a gas supply hole communicated with a gas source, the connector including an inner flange;

a restraining member mounted in the connector and engaged with the inlet end of the main body, the restraining member including an inlet communicated with the gas supply hole of the valve stem and an outlet that is not blockable by the ball; and an insert mounted between the inner flange of the connector and the outer flange of the main body, the insert being molten when it reaches a pre-determined temperature such that the inlet of the restraining member is not communicated with the gas supply hole of the valve stem.

2. The gas safety valve as claimed in claim 1, wherein the second mediate section for receiving the ball has a conic inner periphery.

3. The gas safety valve as claimed in claim 1, wherein the spring is mounted in the first mediate section and partially extended into the second mediate section so as to be borne against by the ball.

4. The gas safety valve as claimed in claim 1, wherein when no gas leakage occurs, a pressure difference between two ends of the ball is relatively small and thus forces the ball to a position not blocking the gas passage, and when gas leakage occurs, the pressure difference between the two ends of the ball is relatively high and thus forces the ball to move toward the outlet end of the main body and thus blocks the gas passage.

5. A gas safety valve comprising:

a main body including a longitudinal through hole that defines a gas passage of a stepped configuration, the longitudinal hole having an inlet end, an outlet end, a first mediate section adjacent to the outlet end, and a second mediate section between the first mediate section and the inlet end, the second mediate section having a diameter greater than that of the first mediate section, the main body further including an outer flange on an outer periphery thereof;

a ball movably mounted in the second mediate section;

a spring mounted in the first mediate section and having an end partially extended into the second mediate section for biasing the ball to a position not blocking the gas passage;

whereby when no gas leakage occurs, a pressure difference between two ends of the ball is relatively small and thus forces the ball to a position not blocking the gas passage, and when gas leakage occurs, the pressure difference between the two ends of the ball is relatively high and thus forces the ball to move toward the outlet end of the main body and thus blocks the gas passage;

the gas safety valve further comprising:

a connector mounted around a portion of the main body and adapted to be connected to a valve seat having a valve stem with a gas supply hole communicated with a gas source, the connector including an inner flange;

a restraining member mounted in the connector and including a first end engaged with the inlet end of the main body and a second end engaged with the valve stem, the restraining member including an inlet communicated with the gas supply hole of the valve stem and an outlet that is not blockable by the ball and that is communicated with the gas passage of the main body;

an elastic member for biasing the valve stem toward the outlet end of the main body; and an insert mounted between the inner flange of the connector and the outer flange of the main body, the insert being molten when it reaches a pre-determined temperature such that the valve stem is moved toward the outlet end of the main body under the action of the elastic member, thereby moving the gas supply hole of the valve stem to a position not communicate with the gas source.

* * * * *